March 9, 1971     P. GAUDLITZ     3,568,259

TYING CLIP

Original Filed Feb. 17, 1966

INVENTOR:
PAUL GAUDLITZ

United States Patent Office 3,568,259
Patented Mar. 9, 1971

3,568,259
TYING CLIP
Paul Gaudlitz, 30 Fuhlsbuttelerweg,
2000 Hamburg 61, Germany
Original application Feb. 17, 1966, Ser. No. 528,273, now Patent No. 3,473,292, dated Oct. 21, 1969. Divided and this application Aug. 4, 1969, Ser. No. 847,360
Claims priority, application Germany, Feb. 19, 1965,
G 42,883, G 42,884
Int. Cl. G65d 63/00
U.S. Cl. 24—30.5       3 Claims

ABSTRACT OF THE DISCLOSURE

An elongated deformable clip for mechanically tying containers such as sausage casings, bags and the like, having two substantially parallel lateral strips, two connecting end portions, an elongated central slot and teeth on the upper and/or lower surface of said lateral strips. For tying said clip is bent around a constricted portion of the casing and one end portion of the clip is drawn through said central slot until the other end portion is engaged by said teeth, simultaneously forming a looped handle for carrying or supporting said tied container.

CROSS-REFERENCE TO RELATED APPLICATION

This is a division of my copending application Ser. No. 528,273, filed Feb. 17, 1966, and entitled "Tying Apparatus for Sausage Casings," and Pat. No. 3,473,292.

BACKGROUND OF THE INVENTION

The present invention relates to an improved tying clip for tying deformable containers, such as sausage casings, bags or the like.

It is already known to employ flexible metallic strips, paper strips which are reinforced by metallic wire-like inserts or cords and yarns as means for tying the gathered portions of sausage casings or the like. The method and devices presently employed to apply ties to gathered portions are either too complicated or incapable of forming ties with looped handles which can serve for suspending the tied containers on hooks or the like. In many instances, such tying operations are still performed by hand and the loop which serves to facilitate suspension must be formed separately, i.e., subsequent to tying of the gathered portions. This consumes much time and the quality and reliability of loops depends almost entirely on the skill and conscientiousness of workers.

My copending application Ser. No. 528,273 discloses an apparatus which can be utilized to convert elongated deformable clips into nooses with looped handles so that the container tied by such clips can be immediately suspended on a hook or the like.

There are already known many types of elongated, deformable clips which can be applied to containers such as sausage casings, bags and the like by bending the clip around a constricted portion of said container and drawing one end of said clips through an opening provided in the other end of said clip. Usually such known clips comprise protrusions or teeth to prevent an undesired reopening of the clip. These known clips, however, cannot be mechanically applied to the containers. Moreover, many known clips fail to form a loop of sufficient size for suspending the tied container on a hook or the like.

SUMMARY OF THE INVENTION

Accordingly, it is an object of the invention to overcome the disadvantages of the known tying clips for tying containers, such as sausage casings, and to provide a tying clip which can be used for mechanically tying constricted portions of the containers by semiautomatic or fully automatic devices.

It is another object of the invention to provide a tying clip which can be applied in a more economical manner by reducing the time necessary for each tying operation and also reducing the number of persons required.

In accordance with the invention there is proposed an elongated deformable clip for tying containers such as sausage casings, comprising two substantially parallel lateral strips and first and second end portions connecting said lateral strips to form an elongated central slot therebetween, and teeth projecting at right angles to the clip plane from at least one of the upper and lower surfaces of said lateral strips, said second end portion being angular in cross-section so that, when said clip is bent around the constricted portion of a casing and said first end portion is drawn through said slot, said second end portion is engaged by at least one of said teeth.

According to a preferred embodiment the clip of the invention is provided with a set of undercut teeth directed away from said first end portion on the upper surface directed away from the constricted container portion.

According to a further embodiment of the invention the clip is provided with sets of teeth on both the upper and lower surfaces of said lateral strips so that after tying the inwardly projecting teeth bite into the constricted container portion.

The novel features which are considered as characteristic for the invention are set forth in particular in the appended claims. The invention itself, however, together with additional objects and advantages thereof will be best understood from the following description of specific embodiments when read in connection with the accompanying drawing.

DESCRIPTION OF THE PREFERRED EMBODIMENTS

Figure 1:
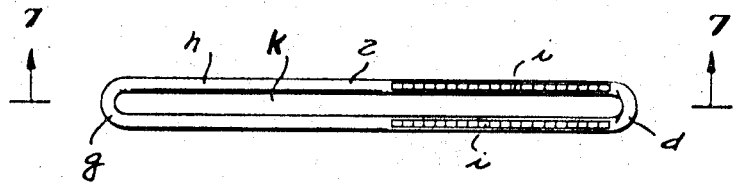
FIG. 1 is a plane view of a clip according to the invention.
Figure 2:
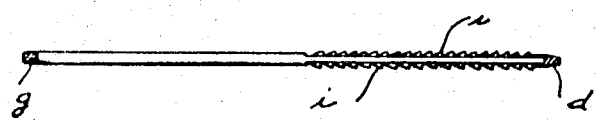
FIG. 2 is a sectional view taken on line 7—7 in FIG. 1.
Figure 3:
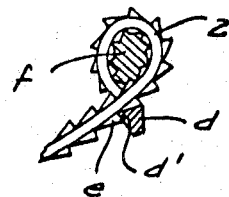
FIG. 3 is a fragmentary sectional view illustrating a tightened and locked loop surrounding a constricted container portion.

In FIGS. 1 to 3 there is shown a tying clip 2 whose shape is best seen in FIGS. 1 and 2. Each clip consists of a pair of parallel lateral portions $h$, a first end portion $g$ and a second end portion $d$, said end portions connecting said lateral strips $h$ to form an elongated central slot $k$ therebetween. In the initial condition the lateral portions of each clip are straight so that the clip is substantially planar. Each of the upper and lower surfaces of said lateral strips $h$ is provided with a set of saw tooth-shaped teeth $i$ projecting, as best seen in FIG. 2 at right angles to the plane of the clip and directed away from said first end portion $g$. The end portion $d$ has a trapezoidal cross-section so that the sharp edge $d'$ is formed on said end portion $d$ to engage a tooth $e$ when the clip is bent around the constricted container portion and said first end portion is drawn through said slot.

The clips according to the invention can be applied to the constricted portion of a container either by hand or mechanically by automatic or semi-automatic machines. A suitable apparatus for mechanically tying containers, such as sausage casings is described in my copending patent application 528,273. For the tying operation the clip is bent around the constricted container portion so that said first and second end portions project on both sides past the constricted container portion.

Thereafter said first end portion is drawn through the central slot near said second end portion to form a sliding loop around said constricted container portion. By merely further pulling said first end portion $g$ said sliding loop tightens around the constricted portion $f$ of the container, until the edge $d'$ of the second end portion $d$ engages the tooth $e$ so that reopening is prevented. Simultaneously the part of the clip adjacent to the first end portion $g$ forms a loop-shaped handle for carrying or hanging up the tied container.

The tying clips of the invention are made from a deformable elastic material, preferably a suitable synthetic resin, i.e. polyethylene, polypropylene, etc. The length and the cross-sectional dimensions of the lateral portions $h$, the width of the central slot $k$, the number and shape of the teeth $i$ can be adapted by those skilled in the art to the size and the weight of the container to be tied, the strength requirements, etc.

The clips of the invention can preferably be produced by punching from continuous strips of synthetic plastic provided with longitudinal teeth ribs. In this case the punch device is adapted to produce the central slots $k$ and to partially divide the clips extending laterally to the original plastic strip.

While the invention has been illustrated and described with reference to a certain specific form of the tying clip, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalents in the following claims.

What is claimed as new and desired to be secured by Letters Patent is set forth in the appended claims:

1. A deformable clip for the machine tying of containers such as sausage casings, said clip having the form of an elongated endless loop comprising two substantially parallel lateral strips with straight side margins, first and second end portions connecting said lateral strips only at the ends thereof to form a longitudinal slot therebetween extending from one end portion to the other, said lateral strips having teeth projecting at right angles to the clip plane from at least one of the upper and lower surfaces of said lateral strips, said second end portion having a cross-section so as to present an inner edge adapted to engage one of said teeth when said first end portion is drawn through said slot after said clip is bent around a constricted portion of the container.

2. A clip as defined in claim 1, wherein each lateral strip is provided on the upper surface thereof directed away from the constricted container portion with a set of undercut teeth directed away from said first end portion.

3. A clip as defined in claim 1, consisting of a deformable synthetic plastic material.

References Cited
UNITED STATES PATENTS
| | | | |
|---|---|---|---|
| 2,979,794 | 4/1961 | Bartolo | 24—17.1 |
| 3,102,311 | 9/1963 | Martin et al. | 24—30.5PBX |

FOREIGN PATENTS
| | | | |
|---|---|---|---|
| 1,168,600 | 9/1958 | France | 24—16PB |
| 1,281,537 | 12/1961 | France | 24—16PB |
| 1,023,438 | 3/1966 | Great Britain | 24—16PB |

OTHER REFERENCES
1,103,058, March 1961, Germany, printed application, B–K 24—16PB.

DONALD A. GRIFFIN, Primary Examiner